United States Patent [19]

Salmon

[11] Patent Number: 4,777,500
[45] Date of Patent: Oct. 11, 1988

[54] ELECTROSTATIC COLOR PRINTER

[76] Inventor: Peter C. Salmon, 70 Angela Dr., Los Altos, Calif. 94022

[21] Appl. No.: 107,789

[22] Filed: Oct. 13, 1987

Related U.S. Application Data

[62] Division of Ser. No. 845,993, Mar. 31, 1986, Pat. No. 4,733,256.

[51] Int. Cl.$^4$ .............................................. G01D 15/00
[52] U.S. Cl. ................... 346/160.1; 346/157
[58] Field of Search .............. 346/155, 157, 160.1; 355/3 DR, 3 DD, 4, 14 D

[56] References Cited

U.S. PATENT DOCUMENTS 4,068,934  1/1978  Mailloux ................................. 355/4
4,660,059  4/1987  O'Brien ................................ 346/157

Primary Examiner—Arthur G. Evans
Attorney, Agent, or Firm—Thomas E. Schatzel

[57] ABSTRACT

An electrostatic color printer incorporating an array of imaging electrodes controlled by special purpose integrated circuits, and a color drum having a charged multilayered particle screen to sequentially present color toners to the imaging array. The special purpose integrated circuits include low voltage, logic and memory circuits, high voltage circuits to drive the imaging electrodes and provide a direct path for the particles to the receiving print medium. The electrodes are arrayed to form a staggered linear array. The printer is capable of printing multiple colors with variable color density in each pixel position and the color image is printed with a single pass of the receiving print medium past the imaging head.

2 Claims, 6 Drawing Sheets

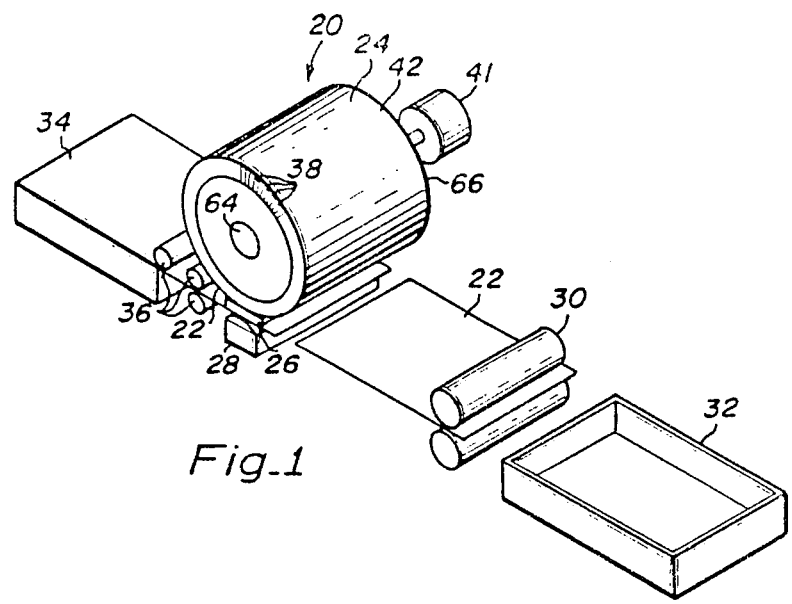
Fig_1
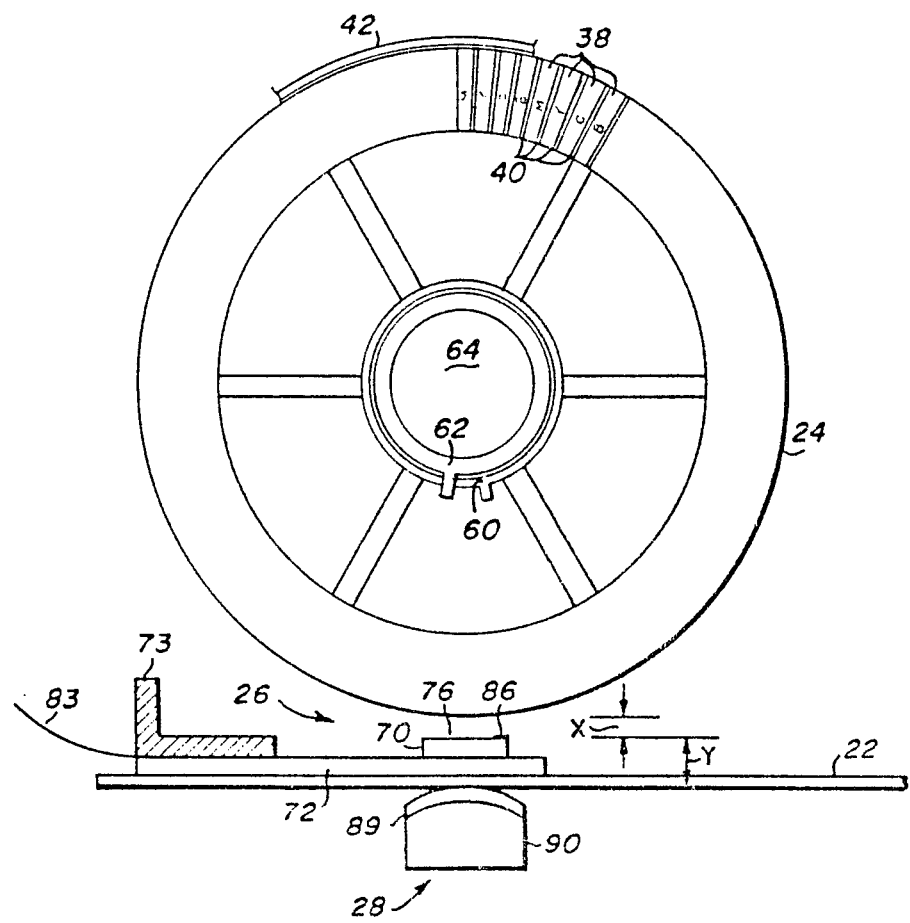
Fig_2

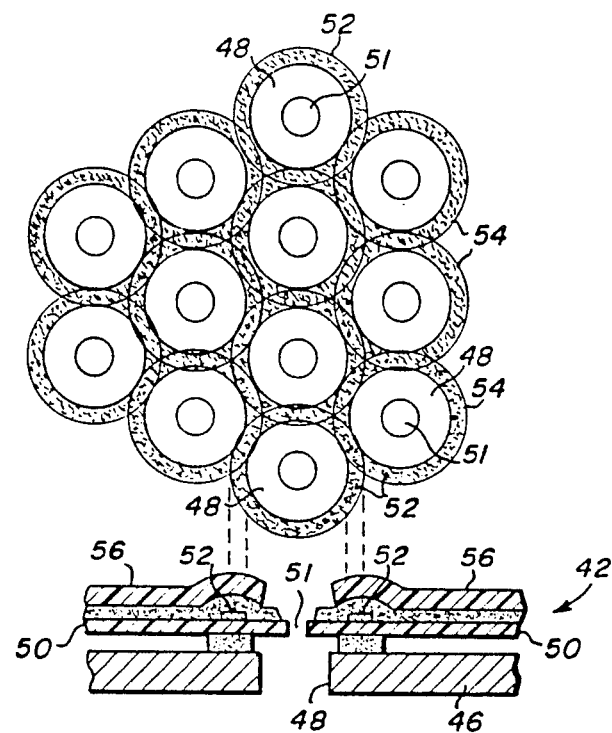
Fig_3
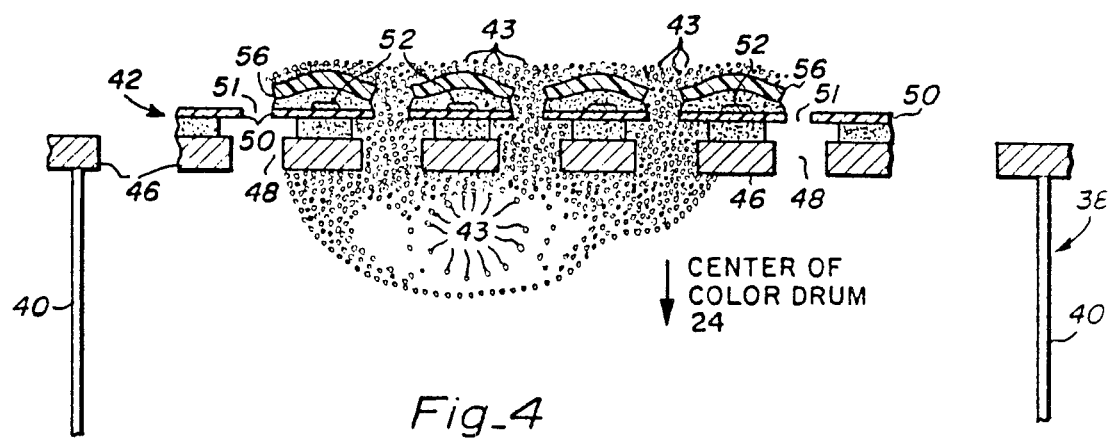
Fig_4

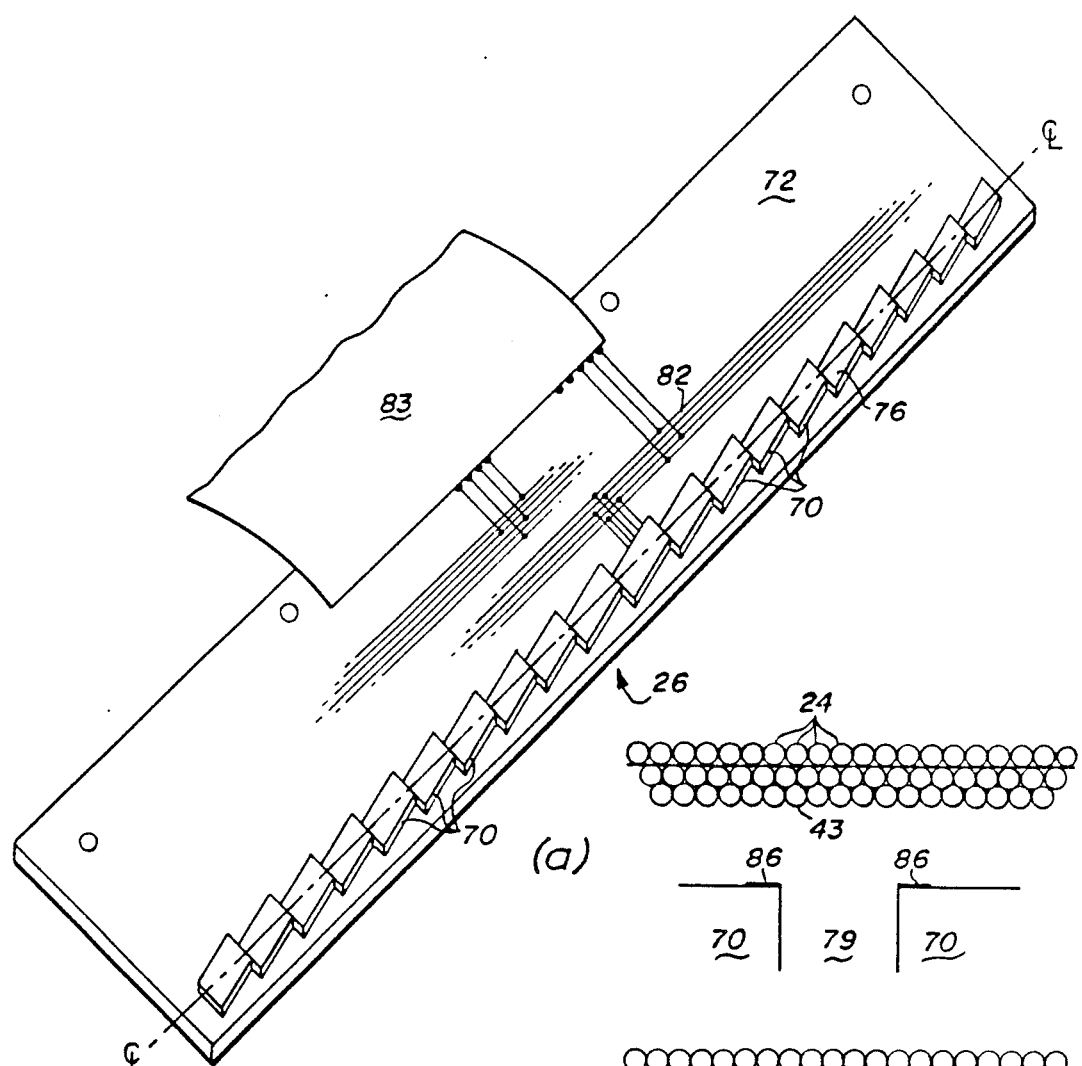
Fig_5
(a)
(b)
(c)
Fig_10

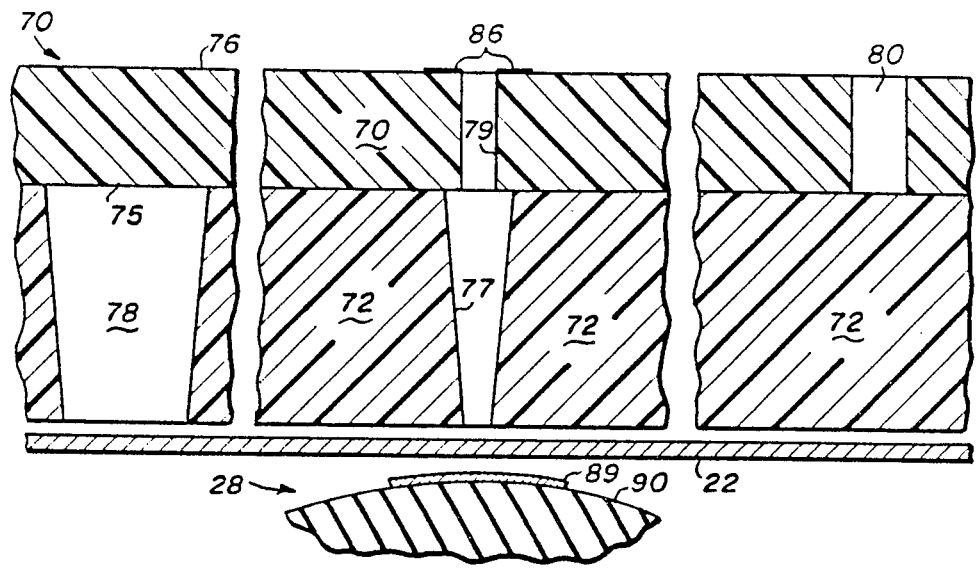
Fig_6
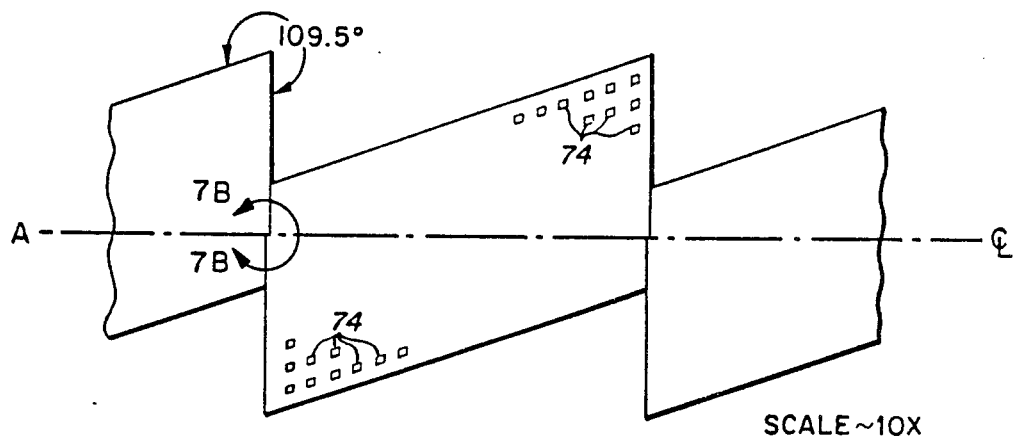
Fig_7A
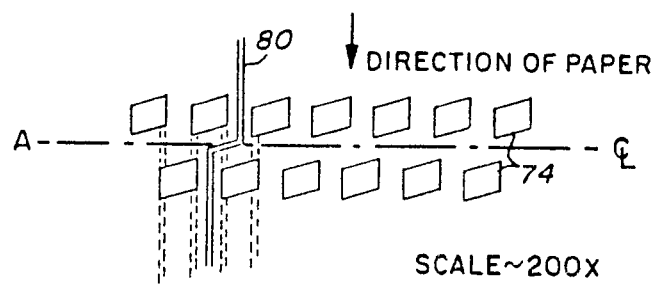
Fig_7B

ELECTROSTATIC COLOR PRINTER

This is a divisional of co-pending application Ser. No. 06/845,993 filed on Mar. 31, 1986 now U.S. Pat. No. 4,733,562.

BACKGROUND OF THE INVENTION

1. Field of the Invention

The present invention relates to electrostatic printers and more particularly to a high speed electrostatic color printer.

2. Description of the Prior Art

Numerous electrostatic printers, both black and white and color, are known in the art. These printers may use processes in which a latent electrostatic image is formed on a photoconductive surface, toned, physically moved and electrostatically transferred to the contacting print medium. Other processes utilize an array of electrodes to write a latent image on a dielectric surface, in place of the photoconductive surface. Direct electrostatic transfer of toner is also used in some of the processes of the prior art. However, none of the prior art printing systems have integrated logic, memory, and imaging capabilities into a single functional element. Nor have effective toner delivery systems been described for color printed systems of this type.

U.S. Pat. No. 3,689,935, issued to Pressman et al., has described a multi-layered particle modulator which utilizes a linear array of apertures to modulate the density of a charged particle stream. The modulated stream can include direct marking toner particles, or may comprise ions which form a latent image on the receiving print medium which is subsequently dusted and developed according to known techniques. Thompson, U.S. Pat. No. 4,068,585, describes a similar apparatus using a multi-layered particle modulator to modulate an ion stream. Focusing of the particles, in both patents, is achieved using the imaging apertures of the modulator. Kilby et al., U.S. Pat. No. 3,979,758, describes an electrostatic write head implemented with integrated circuit technology and employing low voltage binary circuits. U.S. Pat. No. 4,338,615, issued to Nelson et al., discloses an apparatus and method for printing on plain paper utilizing a solid-state write head and electrostatic imaging. An LED array is used to selectively discharge a photoconductive belt, and charge is directly transferred from the belt to the receiving print medium. U.S. Pat. No. 4,356,501, issued to Ronen, describes an integrated silicon nib for an electrostatic printer.

In view of the prior art, there remains a need for a mechanically simple electrostatic color printer capable of printing images in multiple colors, made up of a plurality of pixels, the color density of each of which can be varied, and printing such images in a single pass of the print medium past the writing head.

SUMMARY OF THE PRESENT INVENTION

It is accordingly an object of the present invention to provide an electrostatic color printer which is mechanically simple, small in size, light in weight, and inexpensive to manufacture.

It is another object of the present invention to provide a color printing system requiring very low power.

It is another object of the present invention to provide a highly reliable, high-speed printer capable of high-print quality.

It is a further object of the present invention to integrate logic, memory and imaging capability with computational powers, and to minimize use of external cables and connections.

It is another object of the present invention to provide a printer system wherein the printhead imaging array is segmented to simplify manufacturing and to allow segments to be assembled to provide any desired printhead length.

It is another object of the present invention to provide a printer system which is easily adaptable and configurable to a variety of applications and sizes.

It is another object of the present invention that the printer system can use a variety of non-conductive print media including paper, vellum, mylar and fabric.

It is another object of the present invention that the printer system can be used with dry or liquid toner.

It is another object of the present invention that the printer system is essentially silent in operation.

Briefly, a preferred embodiment of the present invention includes a color drum assembly, a printhead assembly, a back electrode, and controlling circuitry. The color drum has a plurality of toner compartments, radially spaced about the drum. The toner compartments comprise a repeating series of three primary colors plus black. Three such primary colors are, for example, magenta, yellow and cyan. A color drum particle screen is placed about the periphery of the color drum, and comprises a multi-layer metal and dielectric screen adjacent to the toner compartments, with a plurality of apertures, each approximately seventy-five microns in diameter and regularly arranged in staggered rows. The first layer of the particle screen is a metal screen, adjacent to the toner compartments. Bonded to the metal screen is a thin dielectric sheet also with a plurality of apertures coaxial with, but smaller than, the apertures of the metal sheet. Bonded atop the dielectric sheet is a ring-shaped metal electrode, coaxial with and about the same diameter as the metal screen apertures. The ring-shaped electrodes of adjacent apertures abut one another to form a network comprising a common metal electrode. The final layer is another dielectric sheet also with coaxial apertures. The inner metal screen is maintained at an intermediate positive potential (Vmm) while the common metal electrode is maintained at a high positive potential (Vpp).

The printhead is made up of an array of special purpose integrated circuits (ICs) each having a plurality of imaging apertures etched therethrough in a regularly arranged staggered manner to produce a plurality of pixels on the print medium. The apertures and the perimeter of the integrated circuits are shaped so that no imaging discontinuities occur at the joints of these integrated circuits. The IC array is mounted on a base plate which also has a plurality of apertures coaxial with the IC apertures. Each imaging aperture is surrounded at the top of the special purpose IC with a thin film metal imaging electrode which connects the electrode to a high voltage driver circuit. The driver circuits are integrated into the ICs along with conventional low voltage logic and memory circuits.

Bussing and storing bit image data is accomplished using random access type memory, and data is fed into the ICs across the entire baseplate length by a single flex circuit which supplies data, control and power signals. The data and control signals are generated by a printer controller. The printer controller accepts incoming data from an information source, synchronizes imaging and paper movement, implements system timing and control functions, controls a fuser, and sends data in an optimized format to the special purpose ICs. The special purpose ICs are implemented with a dual port random access memory (RAM). One port is dedicated to write cycles while the other is used exclusively for read cycles, allowing write and read operations to occur independently and asynchronously. Each memory cell has two pairs of bit lines to accommodate the dual port architecture and different word sizes for read and write operations.

A back electrode, comprising an insulating support and a conductive member is provided and is positioned in proximity to the printhead, with the print medium interposed therebetween. The back electrode is supplied a potential of approximately minus three hundred volts, and acts with the imaging electrodes of the printhead to selectively accelerate toner particles toward the print medium.

Transfer of toner is accomplished in two steps. The sequencing and control logic of the special purpose ICs selectively supplies a voltage of either ground, or a high positive potential (Vpp) to each imaging electrode according to toner requirements, mediated by the printer algorithm. The grounded electrodes pull positively charged toner particles off the periphery of the color drum, and they form clusters around each electrode under the influence of the local electric field. A weak force continually attracts the positively charged toner particles towards the negative potential at the back electrode, but this force is not strong enough to remove toner particles from the drum without the addition of forces created by the grounded imaging electrodes. After the cluster of toner particles have formed around the selected imaging electrodes, the electrodes are returned to the Vpp potential, repelling the clusters. Most of the toner particles are transferred to the receiving print medium by acceleration through the imaging aperture under the influence of the negative potential at the back electrode. Those particles not accelerated through the imaging aperture are repelled back to the color drum. The color drum particle screen and fringing electric field distribution are such that new toner particles continually migrate to the periphery of the color drum where they are held in equilibrium until removed by imaging pulses.

The imaging cycle is repeated up to n times for a given color drum position, depending upon the desired color density for the particular pixel. As used herein, an imaging cycle is defined as one opportunity for the transfer of a particular toner color from the color drum. A print cycle is the superposition of toner particles from multiple imaging cycles for each of the toner colors. Depending on the translucency of the toner particles, superposition of colors may be used effectively to synthesize complex colors for a given pixel. For nontranslucent toner particles, areas of complex colors can be synthesized using multiple pixel locations, each programmed with a primary color, but with an overall effect observed as a complex color. After toner deposit is completed for a given line of print medium, the medium is moved relative to the printhead and a new line printed. Print medium movement can be done continuously or incrementally. Subsequently, the toner is fused to the medium according to known processes such as the application of heat and pressure.

It is an advantage of the present invention that the printer system is mechanically simple, capable of being made small in size and light in weight, requires very low power, and is inexpensive to manufacture.

It is another advantage that the printer system of the present invention is highly reliable and capable of high print quality and high speed operation.

It is another advantage arising from the method of toner transfer that the printer system of the present invention can print on a variety of nonconductive print media.

It is another advantage of the present invention that the printer system can be adapted to a variety of configurations.

It is an advantage of the present invention that it can be manufactured using automated assembly techniques.

It is yet another advantage of the present invention that the printer system can print multiple colors with variable color density in each pixel position, and the color image is printed with a single pass of the print medium past the printhead.

These and other objects of the present invention will no doubt become apparent to one of ordinary skill in the art after having read the following detailed description of the preferred embodiment which is illustrated in the various drawing figures.

IN THE DRAWINGS

FIG. 1 is a schematic view of a printer system of the present invention;

FIG. 2 is a detailed side plan view of the color drum of FIG. 1;

FIG. 3 is a detailed close-up view of the particle screen of the color drum of FIGS. 1 and 2;

FIG. 4 is a detailed schematic side view of the particle screen of FIG. 3 showing the distribution of charged toner particles in accordance with the electric fields generated;

FIG. 5 is a close-up of the printhead assembly showing the special purpose ICs;

FIG. 6 is a detailed close-up side view of the imaging apertures of the special purpose ICs mounted on the baseplate and illustrating the positioning of the print medium and back electrode;

FIG. 7A is a magnified top plan view showing the shape of the special purpose ICs at the periphery and includes electrical feedthrough locations;

FIG. 7B is a magnified top plan view of the special purpose ICs showing the imaging apertures and geometry of a joint between adjacent ICs;

FIG. 10 is a detailed side view of an imaging electrode and imaging aperture during an imaging cycle wherein FIG. 10(a) represents the imaging electrode at Vpp; FIG. 10(b) represents the imaging electrode at ground potential; and FIG. 10(c) represents the imaging electrode at Vpp.

DETAILED DESCRIPTION OF THE PREFERRED EMBODIMENT

Figure 8:
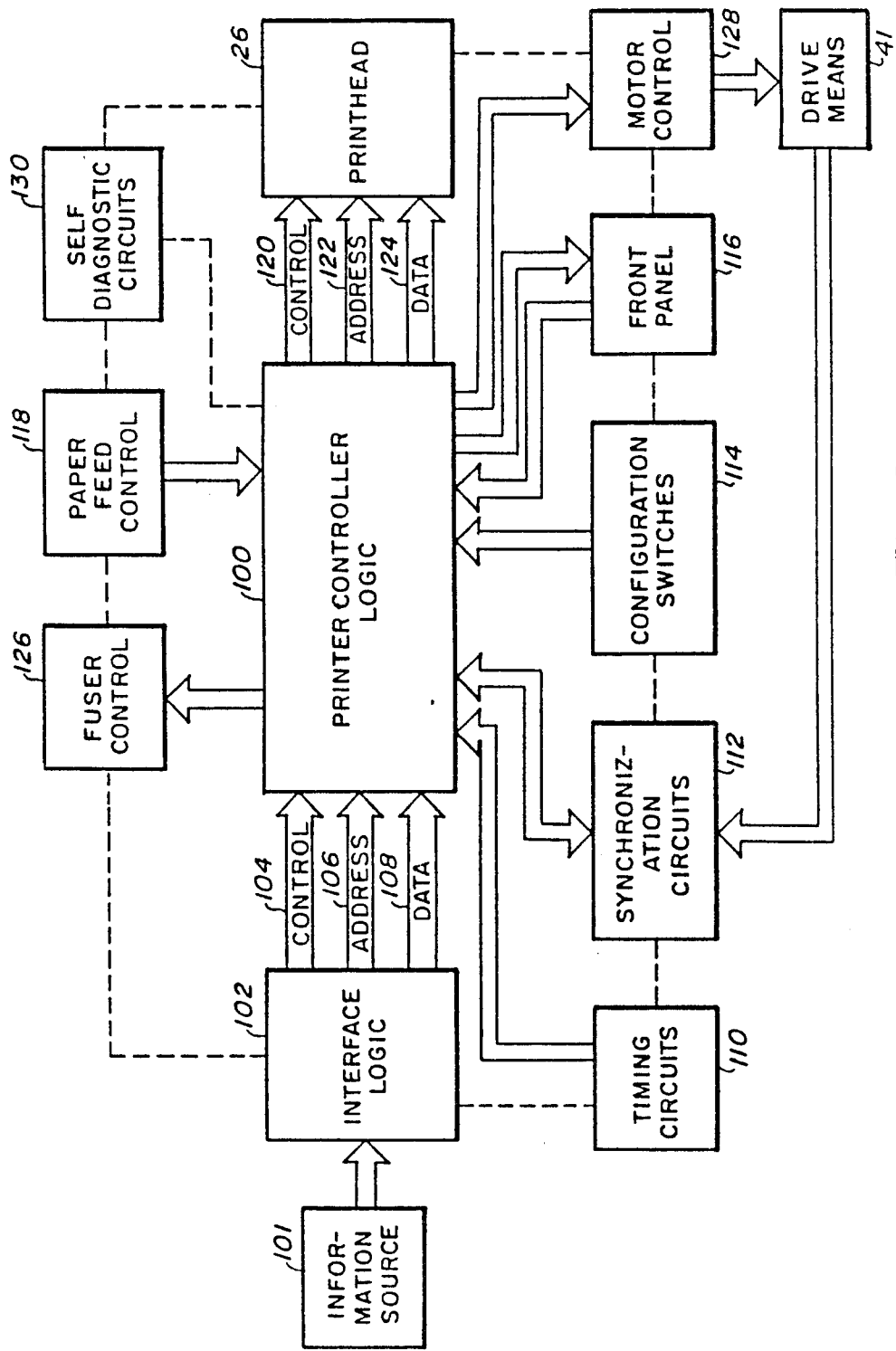
FIG. 8 is a schematic block diagram of the printer control logic.

FIG. 1 illustrates a print system of the present invention and is referred to by the general reference numeral 20. The system 20 is illustrated implemented as a desk top color plotter, designed for use with individual cut sheets of print medium 22. The system 20 includes a color drum 24, a printhead 26 and a back electrode 28.

Cut sheets of print medium 22 emerging from the printhead 26 pass through a fuser 30 and fall into an output cassette 32. An input cassette 34 supplies print medium 22 to the printhead 26 via drive rollers 36.

The color drum 24 is illustrated in detail in FIG. 2 and comprises a plurality of toner compartments 38, radially arranged about the circumference of the drum 24, and separated by a plurality of radial support members 40. Adjacent toner compartments 38 are filled, in a repeating sequence, with magenta, yellow, cyan and black toner Thus, any color combination can be constructed by appropriately incrementing the color drum 24 and applying the appropriate number of imaging cycles for each pixel position for a given line of print. It may be noted that any three primary colors may be used as long as they are capable of being combined to produce any other color. The black toner may be omitted entirely depending upon the primary colors used. A drive means 41 is connected to the color drum 24 to rotate it as is known in the art (see FIG. 1). A color drum particle screen 42 covers the periphery of the color drum 24 and is the means by which a plurality of positively charged toner particles 43 (see FIG. 4) are presented to the printhead 26, and also are restricted from exiting the toner compartments 38 while under the influence of centrifugal forces arising from the drum rotation. The particle screen 42 is illustrated in detail in FIGS. 3 and 4 and is comprised of several layers. A metal screen 46 is secured adjacent to the toner compartments 38 and includes a plurality of apertures 48, each approximately one hundred and fifty microns in diameter and spaced about two hundred microns apart in a uniform pattern of staggered rows. Bonded to the metal screen 46 is a thin dielectric sheet 50, also with a plurality of apertures 51 coaxial with, but smaller than, the apertures 48. Bonded atop the dielectric sheet 50 is a plurality of ring-shaped metal electrodes 52 encircling the apertures 48. Ring-shaped electrodes 52 of adjacent apertures 48 abut one another to form a network comprising a common metal electrode 54. Lastly, bonded atop the dielectric sheet 50 and the common metal electrode 54, is a dielectric cover sheet 56 covering the particle screen 42 except for the apertures 48.

Current sources are connected to the metal screen 46 and to the common metal electrode 54 to allow application of an intermediate positive potential (Vmm), on the order of two hundred volts, and a strong positive potential (Vpp), about two hundred and fifty volts, respectively. The electromotive force required to hold back and to distribute toner particles 43 is variable and is dependent on the size of the apertures 48 and 51 and the rotational speed of the drum 24. Current is supplied via a pair of slip rings 60 and 62 attached to a first hub 64 of the color drum 24 (see FIG. 2). A second hub 66 of the color drum 24 includes a synchronization means (not shown) to synchronize imaging cycles of the printhead 26 with the color drum 24. Such synchronization means may comprise a reflecting radial pattern (not shown) attached to the hub 66 plus a photoelectric beam and sensor (not shown) fixed relative to the color drum 24.

The printhead 26 is illustrated in detail in FIGS. 5 and 6 and includes a plurality of special purpose integrated circuits (ICs) 70, secured to a baseplate 72, which is itself secured to a mounting bracket 73 (illustrated in FIG. 2). The ICs 70 include a plurality of circuits to control and drive imaging through a plurality of imaging apertures 79 (illustrated in FIG. 6). The imaging apertures 79 are regularly arranged on each IC 70 in staggered rows such that an aperture 79 in one row overlaps the apertures 79 in preceding and following rows. Exact shape and spacing of apertures 79 may vary subject to the limitation that the rows provide for overlapping pixels. Size may vary depending upon the diameter of the toner particles 43 and preferably should be about three times the toner particle diameter at a minimum and about six times the toner particle diameter at a maximum. In the system 20, the imaging apertures 79 are etched through a silicon wafer using a wet etch process to yield essentially vertical walls. Preferred crystallographic etching planes result in a trapezoidal shape of the apertures 79 with a characteristic one hundred and nine and one-half degree angle.

FIG. 5 illustrates the ICs 70 in place on the baseplate 72. Each IC 70 has a first side 75, bonded to the baseplate 72 and a second side 76 disposed facing the color drum 24 (see FIG. 6). The ICs 70 are bonded to the baseplate 72, preferably using a bonding agent or glue which would allow removal in the event of rework of a defective IC 70. Alignment of the ICs 70 with the baseplate 72 utilizes optical alignment procedures known in the art plus a vacuum applied to the backside of the baseplate 72 using a baseplate vacuum hole 78. Field assisted thermal bonding can be employed to more permanently fix the ICs 70 in position on the baseplate 72. The baseplate 72 also has a plurality of apertures 77 formed therethrough to coincide with the IC apertures 79. Preferably, the baseplate 72 is a glass ceramic material which can be precisely ground and polished and which is thermally compatible with the IC 70 material. An example of such a glass ceramic material is that produced by Corning Glass Works and sold under the registered trademark Fotoceram. The ICs 70 are mounted upon the baseplate 72 and include an air gap 80, of approximately ten microns, between adjacent ICs 70. The air gap between adjacent ICs 70 includes a step at a centerline "A" of the imaging apertures (see FIGS. 7A and 7B) in order to accommodate overlapping pixels, even at the joint between ICs. The air gap 80 further aids in reducing thermal stress between the baseplate 72 and ICs 70. The air gap 80, however, precludes electrical signals from directly crossing between adjacent ICs 70. Electrical signals are therefore transmitted to each IC 70 via a plurality of electrical feedthroughs 74, as illustrated in FIG. 7A. The preferred architecture for busing and storing data is therefore the random access (RAM) type. Signals are fed in turn to each IC 70 via a series of thin film circuits 82. The thin film circuits 82 receive signals from a single flex circuit 83 which can supply all necessary signals for the print length of the baseplate 72. The flex circuit 83 is a practical way to connect the plurality of ICs 70 with the data circuitry considering the geometries involved. However, any means known in the art for transmitting a large amount of information in a very small space may be utilized e.g. custom pin connectors or electro-optical connection means.

Referring again to FIG. 6, it can be seen that around each imaging aperture 79, is a thin film metal imaging electrode 86. The potential on the electrodes 86 is capable of being varied between ground and Vpp, and these potentials interact with the charged toner particles 43, the color drum particle screen 42, and the back electrode 28 to selectively accelerate the toner particles 43 toward the print medium 22.

The apertures 79 are spaced about fifty microns apart from center to center within a row, and rows are spaced about fifty microns apart from center to center. An approximate mean edge dimension of the apertures 79 is sixty-five microns. This corresponds well with a diameter of the toner particles 43 of ten to twenty microns, and provides a good aspect ratio for width-to-depth necessary to establish the fringing fields for blocking or accelerating the charged toner particles. This size and spacing of the apertures 79 affords the system 20 a resolution of five hundred pixels per inch.

The back electrode 28 comprises a curved metal electrode 89, at least as wide as the width of the special purpose integrated circuit 70, and is suitably mounted on an insulated mounting plate 90 as illustrated in FIG. 2. The back electrode 28 is aligned to be tangential to the color drum 24 and parallel with the baseplate 72, as also illustrated in FIG. 1.

Spacing of the color drum 24, printhead 26 and back electrode 28 is important to ensure fast imaging cycles and low operating voltages. Referring to FIG. 2, the dimension "x" is assigned to the distance between the periphery of the color drum 24 and the surfaces 76 of the special purpose ICs 70. The "y" dimension refers to the distance between the thin film electrodes 86 and the back electrode 89. In the system 20, the x dimension is approximately three mils while the y dimension is about forty mils.

Figure 9:
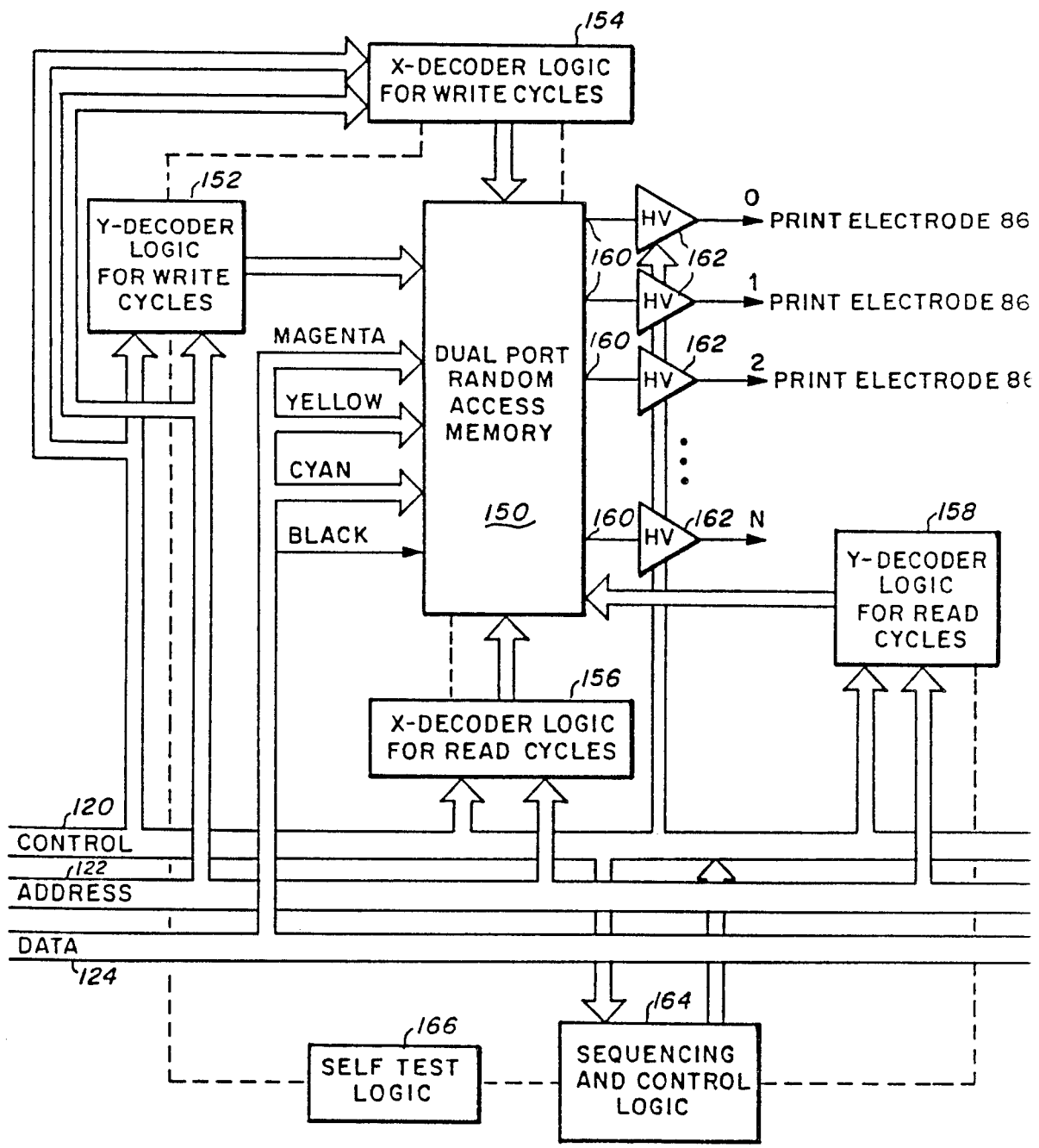
FIG. 9 is a schematic block diagram of memory plus drivers and control and test logic of the special purpose ICs.

FIGS. 8 and 9 are schematic block diagrams representative of the printer control logic and special purpose IC logic, respectively. Such circuits are illustrated as examples only. The actual circuit configurations may vary, and other equally or more suitable circuit configurations may be substituted. Referring to FIG. 8, the printer control logic includes a printer controller logic means 100, which in the system 20 is implemented on a printed circuit board with logic, memory, microprocessor and interface circuits as known in the art. The printer controller logic means 100 receives interface signals from an external information source 101, via an interface logic means 102. The external information source 101 may be, for example a mainframe, minicomputer, or other graphics-capable information source as known in the art, and delivers data including pixel color and density information. A control bus 104, an address bus 106 and a data bus 108 couple the interface logic means 102 to the printer controller logic means 100. Also providing inputs to the printer controller logic means 100 are a timing circuit means 110, a synchronization circuit means 112, a configuration switch means 114, a front panel control means 116, and a paper feed control means 118. Three output buses, namely a control bus 120, an address bus 122 and a data bus 124 are provided to the printhead 26 from the printer control logic means 100. Outputs are also supplied to a fuser control means 126, to the front panel control means 116, to the synchronization circuit means 112, and to a motor control means 128 which controls the drive means 41. A self-diagnostic circuit means 130 may also interface with the printer control logic means 100 to provide self-test and mode control capabilities. The printer control logic means 100 accepts incoming data, provides means to synchronize imaging and paper moving, to format and transfer data to the printhead 26, and to implement general system timing and control functions, including control of the fuser 30.

FIG. 9 illustrates circuitry which resides on the special purpose ICs 70 to provide distributed computational power to the system 20. The ICs 70 include a dual port random access memory 150 which receives color data from the data bus 124. The control and address buses 120 and 122 feed, in parallel, to a Y-decoder logic for write cycle means 152 and to an X-decoder logic for write cycle means 154. Both the Y and X-decoder means 152 and 154 in turn provide inputs to a first port of the dual port random access memory 150. The control and address buses 120 and 122 further provide parallel inputs to an X-decoder logic for read cycles means 156 and a Y-decoder logic for read cycle means 158. Both the X and Y-read decoders 156 and 158 supply inputs to a second port of the dual port random access memory 150. A plurality of outputs 160 of the dual port random access memory 150 each supply output signals to the imaging electrodes 86 of the special purpose ICs 70. The number of imaging electrodes 86, and hence outputs 160, varies depending upon the specific implementation. Intermediate to each output 160 and its corresponding electrode 86 is a high voltage driver 162 to supply the electrodes 86 with the necessary voltage, about plus two hundred and fifty volts, or ground. The high voltage drivers 162 also receive an input from the control bus 120, which itself interfaces with a sequencing and control logic means 164. A self-test logic means 166 may also be included and interfaces with the sequencing and control logic means 164, the Y and X-write decoder means 152, and 154, and the X and Y-read decoder means 156 and 158, to provide self-test capabilities.

The circuitry residing on the special purpose ICs 70 manages input and output data flows, self-test logic when invoked, and timing and control functions required at the pixel level. It does not rely on any signals residing on other special purpose ICs 70 and in this sense the printhead 26 circuitry is modular. The dual port random access memory 150 is superior to shift register memory in terms of chip area per memory bit and is also more flexible in terms of optimizing input and output word size for a particular application. The self-test circuit 166 enhances manufacturability since the ICs can be tested in situ. These self-test circuits 166 may include a test program generator in read only memory (not shown) to store test vectors, a circuit to compress the response into a signature (not shown) and a digital comparator (not shown) to compare the response to the correct response which is also programmed into the circuit.

Printing operations are performed sequentially. For a given line of print, the position of the color drum 24 is incremented, by the drive means 41, and the printer controller logic 100, to cycle through each of the four colors. In principle, the drum 24 could rotate incrementally or continuously. In practice, the drum is driven continuously. The width of each toner compartment 38 together with a chosen color drum diameter and rotational speed results in a transit time which is sufficient to allow multiple transfers of toner 43 from the compartment 38 for each toner color. Typically, the transit tme of a toner compartment 38 past tee printhead 26 is several milliseconds.

Intensity of the colors may be varied by encoding density into bits, for example, three bits would enable specification of eight print densities. The printer control logic means 100 will perform n imaging cycles at each pixel position for a given color. Depending upon the translucency of the toner particles, colors may be superimposed or not. While a variety of types of toner, either liquid or dry, may be utilized in the system 20, the toner particles 43 are dry and comprise a partially conducting mix of pigment and binder. The partially conductive toner allows containment of the toner particles 43 by the particle screen 42. Typically, toner particles 43 comprise hard resins or cross-linked resins which make the particles 43 less sticky and less likely to clog the imaging apertures 79. As an alternative, toner particles 43 may be coated with a hard encapsulate such as a conductive polymer or a conductive amorphous material. Other methods, such as liquid filled hollow spheres and thin surface coatings of platinum group or group VIII materials, may also function. The formation of complex colors relies on known methods for combining primary colors or their compliments to form any desired hue. With a resolution in X and Y directions of 500 dots per inch, a standard size sheet eight and one-half by eleven inches can be printed with over twenty million colored dots or pixels. Each pixel can have four color combinations without density control, or over five hundred color combinations with density control and toner superposition.

The toner transfer process is accomplished in two steps. The high voltage drivers 162 selectively apply a voltage of ground or of Vpp to each imaging electrode 86 according to whether the printing algorithm requires an increment of toner or not. When grounded, the electrodes 86 pull the positively charged toner particles 43 off the periphery of the color drum 24 and they form clusters around each electrode 86 under the influence of the local electric field (see FIG. 10). A weaker attractive force continually attracts all of the positively charged toner particles 43 towards the negative potential at the back electrode 28, but this force is not strong enough to remove particles from the drum 24 without supporting forces created by the grounded imaging electrodes 86. After the clusters have formed around selected imaging electrodes 86, as dictated by the imaging control logic of the special purpose ICs 70, the electrodes 86 are returned to Vpp potential. Cluster particles are repelled and the larger fraction of them is transferred to the receiving print medium 22 by acceleration through the imaging aperture 79 under the influence of the negative potential at the back electrode 28. The precise timing of the imaging pulses is controlled by the sequencing and control logic means 164 according to the print algorithm. Those particles not transferred through the imaging apertures 79 are repelled back up to the color drum 24. The particle screen 24 and fringing electric field distributions are such that new toner particles 43 continually migrate to the surface where they are held in an equilibrium of forces until removed by the imaging pulses. The imaging cycle is repeated up to n times for a given color drum position, depending upon the programmed color density for the particular pixel. Particles of toner 43 impacted onto the print medium 22 are subsequently fused thereto in accordance with a variety of processes known in the art, and in the system 20, a fuser 30 fuses the particles 43 utilizing the application of heat and pressure.

FIG. 4 illustrates the particle screen 42 and the distribution of toner particles 43 when Vpp is applied to the ring-shaped electrodes 52 and Vmm is applied to the metal screen 46. The toner particles 43 are held at the periphery of the color drum 24 by the fringing electric fields, generated between the metal screen 46 at Vmm and the common metal electrode 54 at Vpp. The different colors on the color drum 24 do not intermix at the periphery thereof because the radial support members 40 restrict the passage of toner particles through the screen at the boundary points between colors, and the fringing fields hold the particles 43 close to a given toner compartment 38. Color contamination does not occur at the surface of the printhead 26 because imaged toner particles 43 are transferred out of the vicinity, and the residual toner particles 43 on the surface 76 of the ICs 70 are drawn back up to the color drum 24 by the electric fields before the next imaging cycle begins. The charge distribution within the toner particles 43 is consistent with preventing the particles 43 from flying off the color drum 24, yet allowing them to feed in a controlled manner to replace toner particles 43 used up in prior imaging cycles. A wide variety of toner particle conductivities is available and the particular conductivity can be matched to a given application. The current polarities of the various electrodes, i.e. the metal screen 46, the electrode 54, the imaging electrodes 86 and the back electrode 28 may, of course, be reversed for use with negatively charged toner particles 43.

Effective operation of the printer system 20 may necessitate periodic cleaning cycles, interspersed with the normal imaging cycles. Extraordinary electric fields, for example AC pulses with increasing amplitude or a large DC pulse would be applied between the imaging electrodes 86 and the back electrode 28 to expel the toner particles 43 which may remain from previous imaging cycles. Such a cleaning cycle would be very rapid, e.g. on the order of fifty microseconds, and may be performed routinely after a fixed number of lines are printed.

The color print system 20 can be manufactured in an arbitrarily small size depending upon the quantity of toner to be stored in the color drum 24 and some minimum practical dimensions for the paper feed rollers and fuser 30. The printer can be integrated into hand-held instruments for consumer products, especially if the color drum 24 is packaged as a disposable cartridge or module. Known methods can be used to integrate the color print system 20 with media handling options such as sheet feeders, selectable magazines, or cassettes. Since the ICs 70 and baseplate 72 can be stacked end-to-end up to an arbitrary length, wide bed printer/plotters of arbitrary print width are feasible using the system 20 of the present invention.

It is to be noted that the printer system 20 may be employed, as described, but with the toner compartments 40 filled with toner of colors other than a combination of three primary colors plus black. The printer system 20 may also be modified to omit entirely the color drum 24 and utilize another toner delivery system as known in the art, while retaining the other elements of the system 20. The printhead 26 may be combined with toner delivery and fuser systems as known in the art.

It is also to be noted that the printhead can be implemented as a single passive element comprising a single insulating substrate with imaging apertures and thin or thick film circuits, such printhead being connected using connection schemes known in the art to a printed circuit board implementing the logic that would otherwise reside on the special purpose ICs 70. This passive element can be manufactured from a glass ceramic material, e.g. fotoceram. The passive element, the printed circuit board, and the connection elements are positioned to allow space for the print medium between the passive element and the printed circuit board.

Further, the back electrode 28 may also be omitted entirely and replaced with a plurality of back electrodes (not shown) on each IC 70.

An alternative method for fabricating the individual ICs 70 and the imaging apertures 79 therein, is to use a laser machining process. A standard wafer (which is not required to have the 110 crystal orientation) can be patterned by laser drilling of the apertures 79 and by laser machining of a channel or air gap between ICs. This air gap is continuous except for several tabs or small connective links that hold the die together in wafer form. Prior to processing the active circuits on the wafer according to standard processes as known in the art, the wafer is ground and polished on both sides. The active circuit masks (not shown) are aligned to the apertures 79 and to alignment marks created during the laser machining process. After the active circuit processing is complete, and optionally after initial electrical testing is complete, the die are separated by breaking or laser cutting the adjoining tabs or connective links. By judicious selection of the tab geometries and locations, post-grinding or other removal of remaining bumps or irregularities can be avoided. Geometry of the ICs 70 using the laser method is not restricted to the trapezoidal shape as with the etching process and the preferred shape is rectangular, while still retaining a small step in the periphery at the centerline of the apertures. The laser also allows cutting of circular apertures 79 which are less likely to trap residual toner particles 43 during imaging cycles.

A further embodiment does not require imaging apertures in either the ICs or the backing plate. The special purpose integrated circuits 70 are placed on the opposite side of the print medium 22 from the color drum 24 or other source of toner. A two dimensional array of imaging electrodes is provided on the surface of ICs 70 adjacent to the print medium. Toner particles are pulled off the color drum in a line image tangential to the color drum. The voltage potentials on the imaging electrodes are shifted in synchronism with the advancing print medium and the toner particles are thereby held in place on the print medium. The holding force is gradually reduced as the toner pattern moves further from the original line image position, until gravity is sufficient to hold the toner pattern in place. The ICs 70 are connected to the printer controller logic means 100 using methods known in the art, for example employing chip carriers affixed to a printed circuit board. In this embodiment, the print medium may be a thin plastic film which may be printed as a transparency or may be subsequently laminated with paper or other suitable backing material, and the thinness of the film makes higher print resolutions achievable.

Although described in terms of the presently preferred embodiments, it is to be understood that such disclosure is not to be interpreted as limiting. Various modifications and alterations will no doubt become apparent to one skilled in the art after having read the above disclosure. Accordingly, it is intended that the appended claims be intepreted as covering all alterations and modifications as fall within the true spirit and scope of the invention.

I claim:

1. An improved toner delivery system for color printing systems comprising:

a color drum having a plurality of toner compartments radially spaced about the drum and allowing travel of charged toner particles in a radial direction, a charged multilayered particle screen positioned about the periphery of the drum, and drive and control means for rotating the drum pursuant to control signals.

2. The toner delivery system of claim 1 wherein, said multilayered particle screen comprises a screen comprised of electrically conductive material and secured adjacent to said compartments, a first thin dielectric sheet bonded to said screen, a plurality of ring-shaped electrodes electrically common and bonded to said first dielectric sheet and a second dielectric sheet positioned over said common electrode, said screen, and said first and second dielectric sheets including apertures coaxial with each other and with said ring-shaped electrodes, said apertures being arranged in staggered rows about the surface of the particle screen, said screen having a means for a first potential being applied thereto and said common metal electrode having means for a second potential applied thereto which is of a greater magnitude than that of said first potential.

* * * * *